2 Sheets--Sheet 1.

R. HUNTER.
Marine Propulsion.

No. 150,956.   Patented May 19, 1874.

Witnesses.
A. Ruppert.
B. Edw. J. Eils

Inventor.
R. Hunter
S. P. Holloway & Co
Atty

AM. PHOTO-LITHOGRAPHIC Co. N.Y. (OSBORNE'S PROCESS.)

R. HUNTER.
Marine Propulsion.

No. 150,956.

2 Sheets--Sheet 2.

Patented May 19, 1874.

Witnesses.
A. Ruppert.

Inventor.
R. Hunter

UNITED STATES PATENT OFFICE.

ROBERT HUNTER, OF CINCINNATI, OHIO.

IMPROVEMENT IN MARINE PROPULSION.

Specification forming part of Letters Patent No. 150,956, dated May 19, 1874; application filed January 13, 1873.

*To all whom it may concern:*

Be it known that I, ROBERT HUNTER, of Cincinnati, in the county of Hamilton and State of Ohio, have invented a certain Improvement in Marine Propellers, of which the following is a specification:

My invention is more especially intended to be applied to vessels plying upon canals and other narrow water-courses, where it is of prime importance to prevent, as far as possible, the washing of the banks by the waves created by the propelling mechanism. It consists, first, in the employment of two vertical submerged feathering paddle-wheels, which are arranged at the stern of the vessel, equidistant from the center, and are rotated in opposite directions, the action of the paddles, while propelling the vessel forward, being substantially such that the waves created by the respective wheels run toward each other, and, meeting in the center line of the vessel's wake, "bank up" into a central wave or crest, and gradually subside there, without ever reaching the banks of the canal or stream. My invention further consists in the combination with two vertical submerged feathering paddle-wheels, arranged and operating as set forth, of a mechanism for controlling the position of the feathering-paddles, for steering and other purposes. The special feature of novelty in this combination is that the strain of two such steering paddle-wheels, when operating in the manner specified, will always be in lines parallel to the vessel's course. My invention further consists in making the blades or paddles tapering in width, and arranging them with the broader end at the bottom and the narrower end at the top of the wheels. The object of this construction and arrangement of the paddles is to increase the banking up of the water, heretofore alluded to, and this they accomplish by creating stronger currents at the bottom than at the top of the wheels, so that the meeting bottom currents will induce a strong upward pressure or current.

Figure 1:
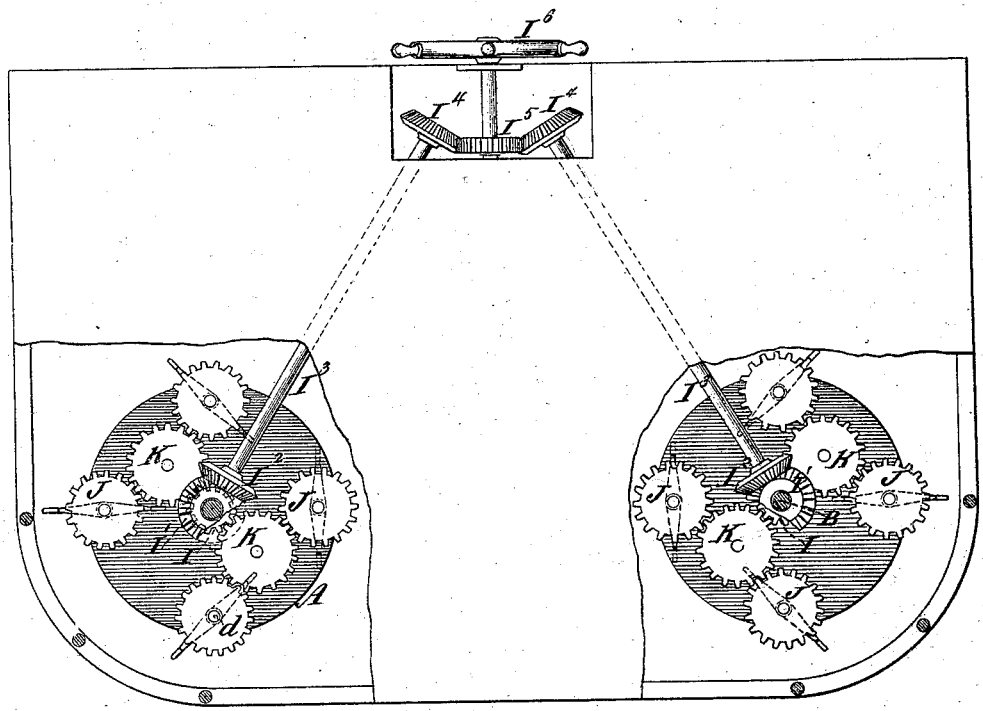
Figure 2:
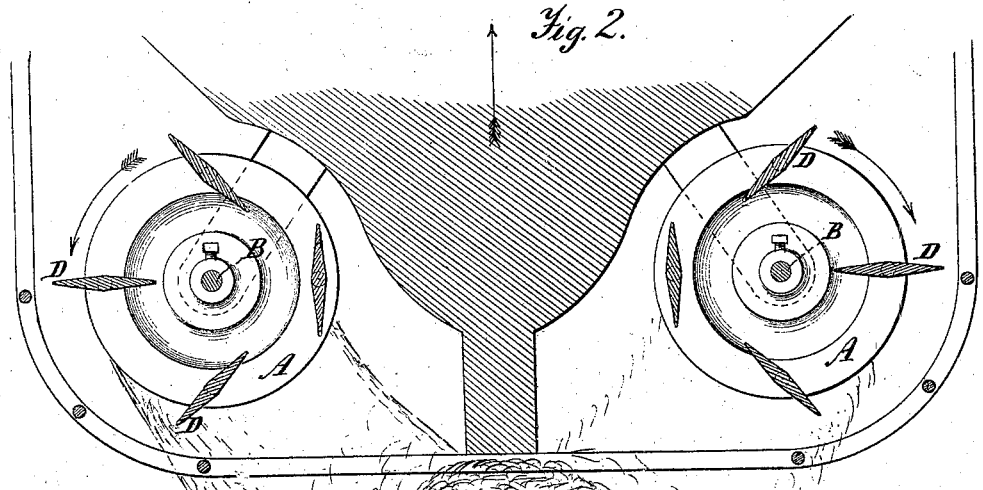
Figure 3:
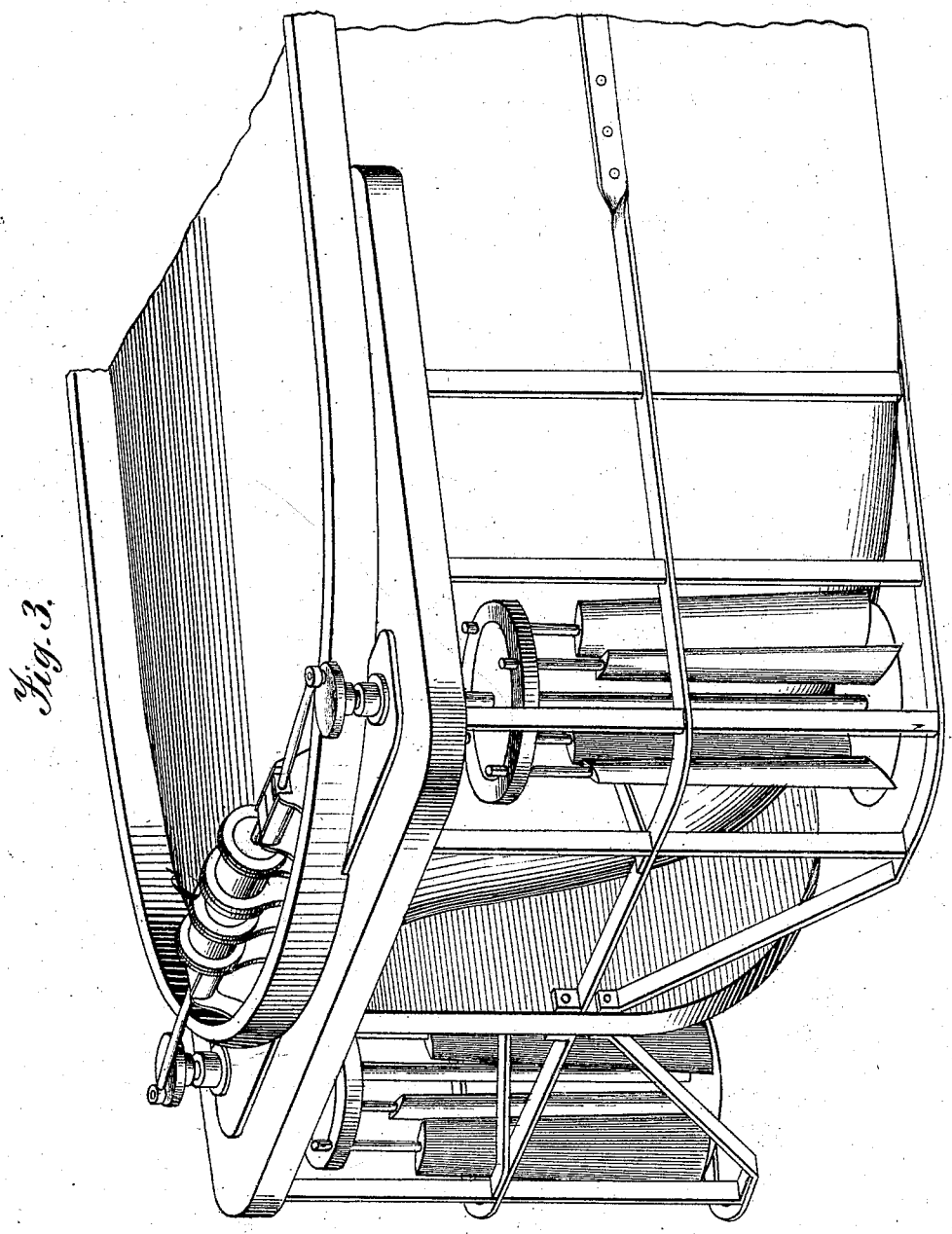

Figure 1 is a sectional plan view, illustrating my invention. Fig. 2 is a similar view, showing more conspicuously the position of the paddles at different points of the wheel's rotation. Fig. 3 is a perspective view of the rear end of a vessel provided with paddle-wheels according to my invention, showing one device for operating the wheels simultaneously. The gearing for operating the blades is omitted in this figure.

The paddle-wheels W and W', used in this connection, are arranged vertically—that is, so as to rotate in planes parallel to the surface of the water, the blades or paddles being, consequently, continuously in contact with the water. The blades may be wholly or only partially immersed, and adapted for adjustment as to their extent of immersion. The wheels are placed at the stern of the vessel, one upon each quarter, and about equidistant from the center. They are rotated by means of a steam-engine, C, or by two separate engines, but always at the same relative speed and in opposite directions, as indicated by the curved arrows in Fig. 2. The wheels being immersed, it becomes necessary to construct them with feathering-paddles. In illustration of our invention, we have chosen wheels the paddles of which rotate continuously upon their own axes at such a rate of speed as to make, severally, one revolution to every two revolutions of the entire wheel. In such a wheel there is a point where the blades will stand at exactly right angles to the line of the vessel's course and obtain a square pull upon the water. Directly opposite to this point the blades will stand parallel to said line, and at the intermediate points the blades will exert a propelling action, in manner like the blade of a screw-propeller. Although I prefer to use wheels of this peculiar construction, others may be substituted, provided their blades have, at one point in the revolution of the wheel, a square pull upon the water. Whatever style of wheels may be adopted, they must be so arranged that the points of maximum propelling action of the paddles—that is, where they stand at right angles to the vessel's course—will be where their axes are at the greatest distance from the vessel's center; in other words, upon the outer sides of the respective wheels, as clearly illustrated in Figs. 1, 2, and 3. The wheels thus arranged and operating will throw strong currents of water across the stern of the vessel. These currents or waves, meeting at the center line of the vessel's wake, destroy each other by first banking up and then gradually subsiding, without ever reaching the banks of the stream. Practically, these currents or waves meet at, or nearly at, the stern-post, so that, instead of the usual depression in the water at that point, tending to retard the progress of the vessel, there will now be an elevated bank of water, which must necessarily aid largely in the propulsion of the vessel. The initial devices of the mechanisms for imparting the feathering action to the paddles of the respective wheels are connected to a steering-wheel, by means of which they may be shifted for the purpose of changing the points of maximum propelling action of the paddles, and, consequently, the course of the vessel.

The construction of the wheels and steering mechanisms shown is as follows: The frame A of each wheel is rigidly secured to its vertical driving-shaft B. Each blade D is journaled at its midwidth, at both ends, to the frame A, and the projecting end $d$ of the upper journal receives the device through which the feathering action is transmitted to the blade. For this purpose gear-wheels J may be keyed to said journals, connected by intermediates K with the wheel I, which is localized but loose upon the shaft B, and is the initial device of the feathering mechanism. The gear-wheels I of the respective paddle-wheels may be held from revolving by any device attached to the vessel. Thus they may be controlled by levers connected by suitable ropes or chains to a steering-wheel, by means of which the wheels I may be adjusted for the purpose of changing the points of maximum propelling action of the paddles. By such adjustment of the wheels I the vessel can be steered, and the rudder, therefore, dispensed with.

The means I have shown for controlling the wheels I consist of the following devices: Each wheel I has connected to it a bevel-wheel, $I^1$, gearing respectively into the bevel-wheels $I^2 I^2$ upon the diverging shafts $I^3 I^3$. Each shaft $I^3$ carries at its opposite end a bevel-wheel, $I^4$, gearing into a cog-wheel, $I^5$, upon the shaft of the steering-wheel $I^6$, which is to be manipulated by the helmsman in the usual manner.

The paddles D are made tapering from end to end, and are connected to the wheels with the broader end at the bottom, for the purpose already stated.

What I claim as my invention, and desire to secure by Letters Patent, is—

1. The combination of two vertical immersed paddle-wheels, arranged at the stern of a vessel, about equidistant from its center, and rotated in opposite directions, the paddles being feathered, so as to obtain a square pull upon the water at the outer sides of the respective wheels, substantially as and for the purpose specified.

2. Two paddle-wheels, arranged and operating as described, in combination with tillers or equivalent devices, which, by governing in unison the initial devices of the respective feathering mechanisms of the wheels, control the location of the points of maximum propelling force of the paddles for steering purposes.

3. Two paddle-wheels, arranged and operating as described, and having tapering paddles, which are disposed with their broader ends at the bottom of the wheels, substantially as and for the purpose specified.

In testimony of which invention I hereunto set my hand.

ROBERT HUNTER.

Witnesses:
FRANK MILLWARD,
J. L. WARTMANN.